(12) United States Patent
Chow et al.

(10) Patent No.: US 7,860,885 B2
(45) Date of Patent: Dec. 28, 2010

(54) INBOUND CONTENT FILTERING VIA AUTOMATED INFERENCE DETECTION

(75) Inventors: Richard Chow, Sunnyvale, CA (US); Philippe J. P. Golle, San Francisco, CA (US); Jessica N. Staddon, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 327 days.

(21) Appl. No.: 11/951,198

(22) Filed: Dec. 5, 2007

(65) Prior Publication Data
US 2009/0150365 A1      Jun. 11, 2009

(51) Int. Cl.
*G06F 17/30* (2006.01)

(52) U.S. Cl. .................. 707/769; 707/706; 707/754; 707/771; 707/E17.059; 707/E17.061; 707/E17.062; 707/999.001; 707/999.003; 707/999.004

(58) Field of Classification Search ........................ None
See application file for complete search history.

(56) References Cited

U.S. PATENT DOCUMENTS

| | | | |
|---|---|---|---|
| 6,246,977 B1 * | 6/2001 | Messerly et al. ............... 704/9 |
| 6,654,787 B1 * | 11/2003 | Aronson et al. ............. 709/206 |
| 2001/0044720 A1 * | 11/2001 | Lee et al. ..................... 704/251 |
| 2005/0256866 A1 * | 11/2005 | Lu et al. ......................... 707/5 |
| 2006/0288076 A1 * | 12/2006 | Cowings et al. ............. 709/206 |
| 2007/0038705 A1 * | 2/2007 | Chickering et al. ......... 709/206 |
| 2007/0088687 A1 * | 4/2007 | Bromm et al. ................. 707/4 |
| 2007/0174255 A1 * | 7/2007 | Sravanapudi et al. ........... 707/3 |
| 2008/0033797 A1 * | 2/2008 | Chickering et al. ........... 705/14 |
| 2008/0077558 A1 * | 3/2008 | Lawrence et al. .............. 707/3 |

* cited by examiner

*Primary Examiner*—Don Wong
*Assistant Examiner*—Andalib F Lodhi
(74) *Attorney, Agent, or Firm*—Park, Vaughan, Fleming & Dowler LLP; Shun Yao

(57) ABSTRACT

A system is provided to detect email spam. During operation, the system receives an email, extracts a set of keywords from the email body, and constructs a first search query based a keyword extracted from the email body. The system further constructs a second search query based on the keyword in the first query and one additional word which pertains to a known spam word or to the subject of the email. Next, the system receives a first number of hits and a second number of hits in response to the first and second search queries, respectively. The system then determines whether the email is spam based on the first number and the second number. The system can also perform Website filtering using inference detection which is based on search results received in response to search queries formulated with keywords extracted from Websites.

6 Claims, 5 Drawing Sheets

INBOUND CONTENT FILTERING VIA AUTOMATED INFERENCE DETECTION

RELATED APPLICATIONS

The instant application is related to U.S. patent application Ser. No. 11/729,576, entitled "Method and System for Detecting Undesired Inferences from Documents," filed 28 Mar. 2007; U.S. patent application Ser. No. 11/957833, entitled "Outbound Content Filtering via Automated Inference Detection," filed Dec. 17, 2007; and U.S. patent application Ser. No. 11/947,292 , entitled "Augmenting Privacy Policies with Inference Detection," filed 29 Nov. 2007; which are incorporated by reference herein.

FIELD OF THE INVENTION

The present invention relates to the design of intelligent data processing. More specifically, the present invention relates to a method and system for inbound content filtering via inference detection.

RELATED ART

The relentless growth of the Internet has made the World-Wide Web (the Web) one of the largest and most accessible pool of information today. However, the ubiquitous Internet connectivity also makes it possible for undesired and sometimes malicious information, such as spam emails and malicious Websites, to reach a user's computer. Spam emails not only occupy a user's mailbox space, they could also be "phishing" emails which can defraud the user and obtain sensitive personal data. Malicious Websites can consume a user's bandwidth, install trojans, and breach the security of the user's computer and networks.

Filtering inbound content is particularly important for an organization, such as a corporation or university. Such filtering is also valuable to parents who want to protect their children from harmful content such as pornography and violence. Conventional email and Website filtering technologies are largely based on keyword lists, mail-server blacklists, and Web address blacklists. For example, a spam-email program typically maintains a list of spam keywords, such as "mortgage" and "viagra," and attempts to filter out emails containing these words. A Website filtering program typically maintains a list of URLs for identified Websites to which access should be restricted. However, the content of spam emails and undesired Websites as well as their server addresses are constantly changing, which makes it difficult to keep keyword lists and blacklists up-to-date.

SUMMARY

One embodiment of the present invention provides a system that detects unwanted email. During operation, the system receives an email, extracts a set of keywords from the email body, and constructs a first search query based on at least one keyword extracted from the email body. The system further constructs a second search query based on the keyword used for the first search query and at least one additional word. Next, the system receives a first number of hits and a second number of hits in response to the first and second search queries, respectively. The system then determining whether the email is unwanted based on the first number and the second number; and produces a result to indicate that the email is unwanted based on the determination.

In a variation on this embodiment, extracting the keywords from the email body involves determining a term-frequency inverse-document-frequency (TF.IDF) weight for a respective word or phrase contained in the email body.

In a further variation, extracting the keywords from the email body further involves ranking a respective word based on its TF.IDF weight.

In a variation on this embodiment, the additional word is a spam topic word. Constructing the second query comprises including the additional word in the first query.

In a variation on this embodiment, the additional word is a word extracted from the email subject.

In a variation on this embodiment, determining whether the email is unwanted based on the first number and the second number involves computing a ratio between the first number and the second number.

One embodiment of the present invention provides a system that filters Web content. During operation, the system receives a restricted-topic word which pertains to a topic to be restricted. The system then searches the Web based on the restricted topic word, and receives a set of documents in response to the search. The system further extracts keywords from the received documents and constructs a first search query based on at least one extracted keyword. In addition, the system constructs a second search query based on the keyword used for the first search query and the restricted-topic word. The system then receives a first number of hits and a second number of hits in response to the first and second search queries, respectively. Next, the system determines whether the keyword pertains to the restricted topic based on the first number and the second number. The system produces a result indicating whether the keyword pertains to the restricted topic based on the determination, thereby facilitating filtering of Web pages pertaining to the restricted topic.

In a variation on this embodiment, extracting keywords from the received documents involves determining a TF.IDF weight for a respective word or phrase contained in the documents.

In a further variation, extracting the keywords from the received documents further involves ranking a respective word based on its TF.IDF weight.

In a variation on this embodiment, determining whether the keyword pertains to the restricted topic comprises computing a ratio between the first number and the second number.

DETAILED DESCRIPTION

Figure 1:
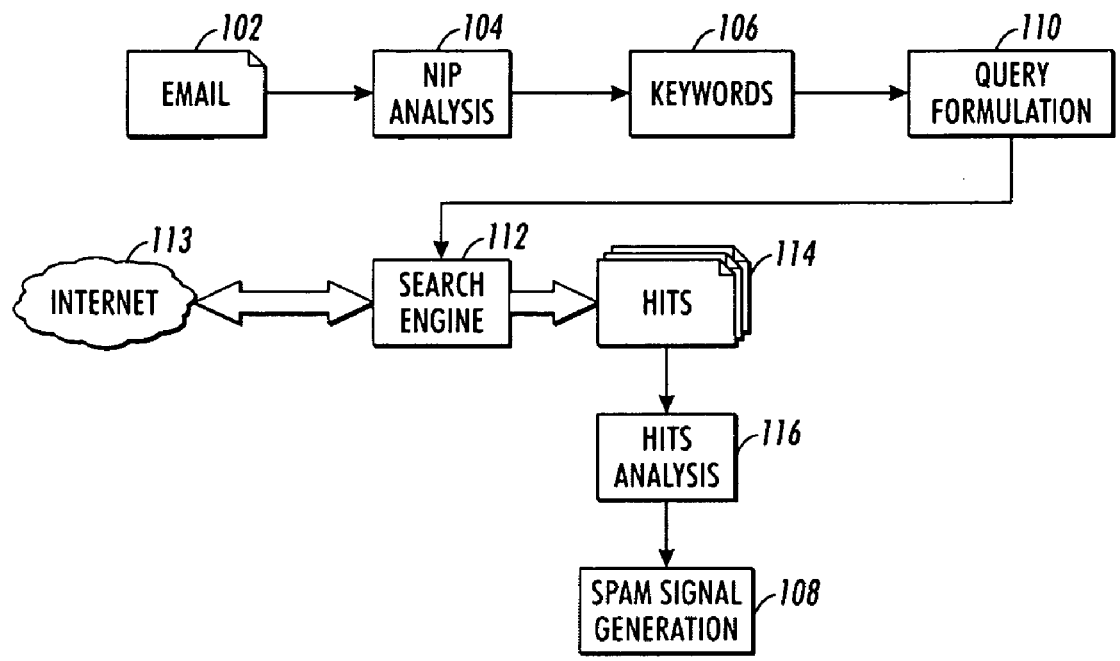
FIG. 1 illustrates an exemplary block diagram for a system that filters incoming emails in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Embodiments of the present invention provide automated techniques for detecting inferences drawn from the content of one or more documents which can be used to manage or filter inbound content. In particular, such inference-detection techniques are used to detect spam emails and/or filter undesired Web content to protect enterprise workers and children.

Spam emails and undesired Websites often contain information that obscures the true subject matter contained therein. Sometimes, a piece of incoming content may not contain explicit words pertaining to an undesired subject matter, but may nevertheless allow the user to infer the subject matter. For instance, suppose that an organization wishes to filter any incoming content (e.g., emails, Websites) that pertains to Osama Bin Laden. The filtering system can filter any email or Website containing explicit identifying information, e.g., words such as "Osama," "Bin," "Laden," and "OBL." However, when a piece of content does not contain any explicit identifying word, it can pass the filtering system and still be recognized as pertaining to Osama Bin Laden. For example, an email containing the language "the son of a Saudi construction magnate who came from Yemen" can allow a reader to infer that the subject matter of this sentence is Osama Bin Laden, because a Web search with the query "Saudi construction magnate Yemen" returns numerous hits about Osama Bin Laden. Nevertheless, the filtering system would not be able to catch this email.

Embodiments of the present invention provide novel techniques that can not only capture explicit words and phrases, but can also detect inferences in the incoming content, thereby allowing the system to filter undesired content which is obscured. In some embodiments, a large corpus such as the Web or a corporate intranet is used as a proxy for human knowledge to enable understanding of what inferences can be drawn from a document, such as an email or a Web page. One technique used in these embodiments is to extract keywords from a document, use these keywords to construct search engine queries, and analyze the results (also referred to as "hits") returned in response to these queries. In some embodiments, the system examines the number of hits. In further embodiments, the system examines the content of the hits.

In this disclosure, "corpus" refers to a collection of documents. In one embodiment, a corpus can include all the documents available on the Web. The corpus can also be a collection of documents internal to an organization. Additionally, the system can operate based on one or more corpora.

FIG. 1 illustrates an exemplary block diagram for a system that filters incoming emails in accordance with an embodiment of the present invention. During operation, the system receives an email 102, performs Natural Language Processing (NLP) analysis 104 to email 102, and extracts a set of keywords 106. The system then formulates a number of queries (operation 110), and issue these queries to a search engine 112. Search engine 112 conducts the corresponding searches in Internet 113 and returns a number of hits 114. The system then analyzes the hits (operation 116) and generates spam signals for email 102 (operation 108).

Figure 2:
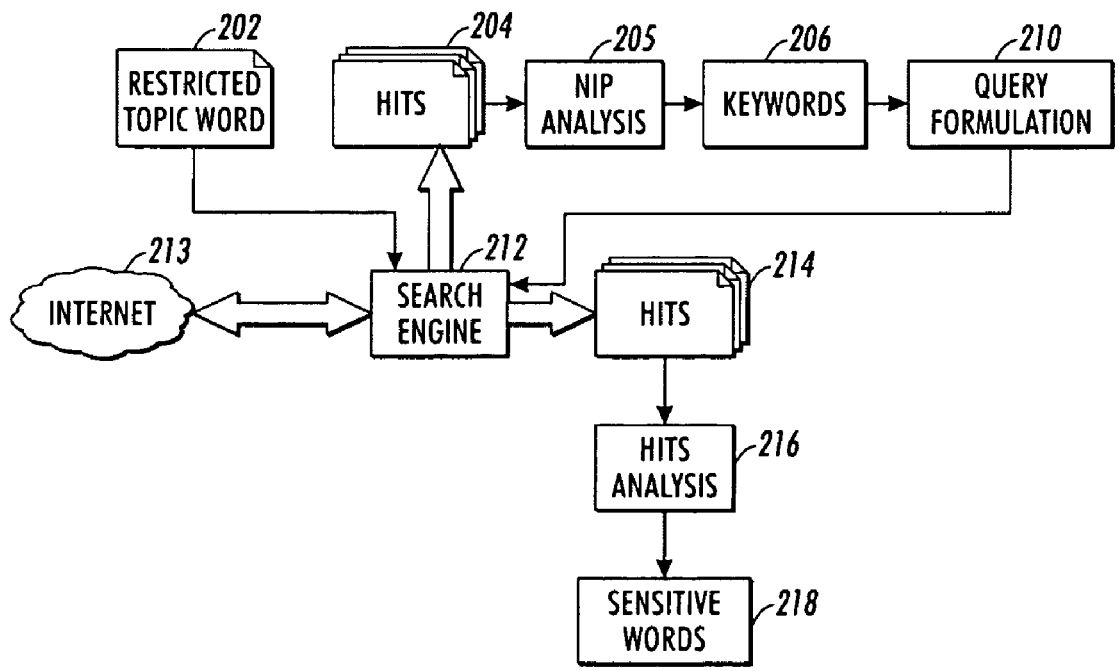
FIG. 2 illustrates an exemplary block diagram for a system that filters Websites in accordance with an embodiment of the present invention.

FIG. 2 illustrates an exemplary block diagram for a system that filters Websites in accordance with an embodiment of the present invention. During operation, the system first receives a restricted-topic word 202. For example, restricted-topic word 202 can be "gambling" or "lending." The system then issues a search query based on restricted-topic word 202 to a search engine 212. Search engine 212 conducts a corresponding Web search in Internet 213 and returns a set of hits 204. The system then performs NLP analysis 205 to hits 204 and extracts a set of keywords 206. Based on keywords 206, the system formulates a set of search queries (operation 210) and issues these queries to search engine 212. In response, search engine 212 returns a set of hits 214. The system then performs analysis on hits 214 (operation 216) and obtains a list of sensitive words 218 associated with the restricted topic. The system can then use this list of sensitive words to filter Web pages.

Spam Detection

One commonly practiced spamming technique is obfuscation. With obfuscation, the originator of a spam email deliberately misspells keywords in the email to obscure the real topic of the email. For example, in the email illustrated in TABLE 1, "viagra" is deliberately misspelled as "viarga."

TABLE 1

Date: Wed, 28 Feb 2007 20:04:55 -0060
From: Zona Jessup moisturizingburgs@hca.es
To: abc@abc.abc
Subject: zkk v ldzyi
Hello. Let me say a few words about myself. My name is Dr. AbrahamMorgentaler, an associate professor of urology at Harvard MedicalSchool and author of The Viarga Myth: The Surprising Impact on Love andRelationships.That is what i think about Viarga:
   -Viarga seems to be changing not only the firmness of a man's penes,it also seems to be changing the way people think about sex.
   -Viarga is really one of the most remarkable advances in medicine inthe last 50 years.
   It's remarkable, but the effect of Viarga is so far beyond its puremedical indication. The effects are psychological, they're attitudinal,they're behavioral and they're societal...
☐ -Viarga has turned out to be a door into certainly the minds of thepsyche of men but also of women and what it is that relationships meansfor us.
-The Viarga experience has shown us that men care deeply about being agood sexual partner,they want not just to be adequate but to be admired.Viarga can play into that.My advice is that you must visit thesite.Abraham Morgentaler In one embodiment, the system can extract keywords from a received email and determine the true topic of the email. One implementation of this embodiment involves the following operations:

1. The system extracts keywords from the email. In one embodiment, the system uses NLP techniques to extract a number of top-ranked keywords.

2. The system then constructs a first set of search queries based on the keywords and keyword combinations (also referred to as "phrases"). Let $\{Q_i\}$ denote the set of queries issues corresponding to keyword or keyword combination i. Note that the maximum number of keywords used in each query and the number of queries to be issued are parameters that can be tuned by a user based on the desired running time and thoroughness of the inference detection. In one embodiment, a respective query is formulated by listing the selected keywords and separating these keywords by spaces. Other query formulation techniques are also possible.

3. The system issues search queries $\{Q_i\}$ to a search engine and, in response to each search query $Q_i$, receive a number of hits $n_i$.

4. The system also constructs a second set of search queries. A respective search query in the second set is similar to a corresponding query in the first set, but includes at least one known spam topic word such as "viagra," "lottery," "mortgage," etc. A respective query in this second set is denoted as $\{Q_{i,j}\}$, wherein i denotes the corresponding keyword or keyword combination, and j denotes the spam topic word. For example, if $Q_i$="A B C" (note that in one embodiment the actual query does not include the quotation marks), then $Q_{i,1}$="A B C viagra," $Q_{i,2}$="A B C lottery," etc. Let $n_{ij}$ denote the number of hits returned by the search engine in response to $Q_{i,j}$.

5. For queries $Q_{i,j}$ and $Q_i$, if $n_{ij}/n_i$ is sufficiently large, the system signals that the email may be a spam email related to topic word j. Note that the decision to treat the email as spam may also depend on the number of such query pairs with sufficiently large $n_{ij}/n_i$ ratio (i.e., $Q_i$ and $Q_{i,j}$) and the likelihood that the corresponding topic is indeed a spam topic.

For example, referring to the spam email in TABLE 1, the Google query "sex medicine firm" returns approximately 1,210,000 hits, while the query "sex medicine firm viagra" returns approximately 586,000 hits. The corresponding $n_{ij}/n_i$ ratio is 0.48, which in one embodiment may be sufficient to mark the email as spam.

In one embodiment, to extract keywords from the email, the system employs automated content analysis to extract keywords in these documents. The system can use any NLP tool, ranging from text extraction to in-depth linguistic analysis. In one embodiment, the system selects keywords based on a "term frequency—inverse document frequency" (TF.IDF) analysis. Note that the term "keyword" as used in this disclosure is not limited to a single word, but can include words, phrases, abbreviations, synonyms, or any combination of language symbols.

In a TF.IDF analysis, the system assigns a respective word in the email a TF.IDF weight. The system uses this weight, which is a statistical measure, to evaluate how important the word is to a document (i.e., the email) in a corpus (e.g., the Web). The importance of a word increases proportionally with the number of times the word appears in the document, but is offset by the frequency of the word occurrence in the corpus. For example, the TF.IDF weight of a term i, denoted as ti, with regard to a given document, can be computed as follows:

$$W_{TF.IDF} = \frac{n_i}{\sum_k n_k} \cdot \log \frac{|D|}{|\{d : t_i \in d\}|}.$$

In this formula, term frequency $$\frac{n_i}{\sum_k n_k}$$

is the number of occurrences of $t_i$ in the document, normalized by all the term occurrences in the document. The inverse document frequency, $$\log \frac{|D|}{|\{d : t_i \in d\}|},$$

is a measure of the general importance of the term and is computed as the logarithm of the number of all documents in the corpus divided by the number of documents containing the term $t_i$.

The above formula for computing TF.IDF weight is only one example of TF.IDF definition. For different applications, different TF.IDF definitions can be adopted. In addition, embodiments of the present invention can also use other linguistic analysis approaches to derive knowledge from a document.

Figure 3:
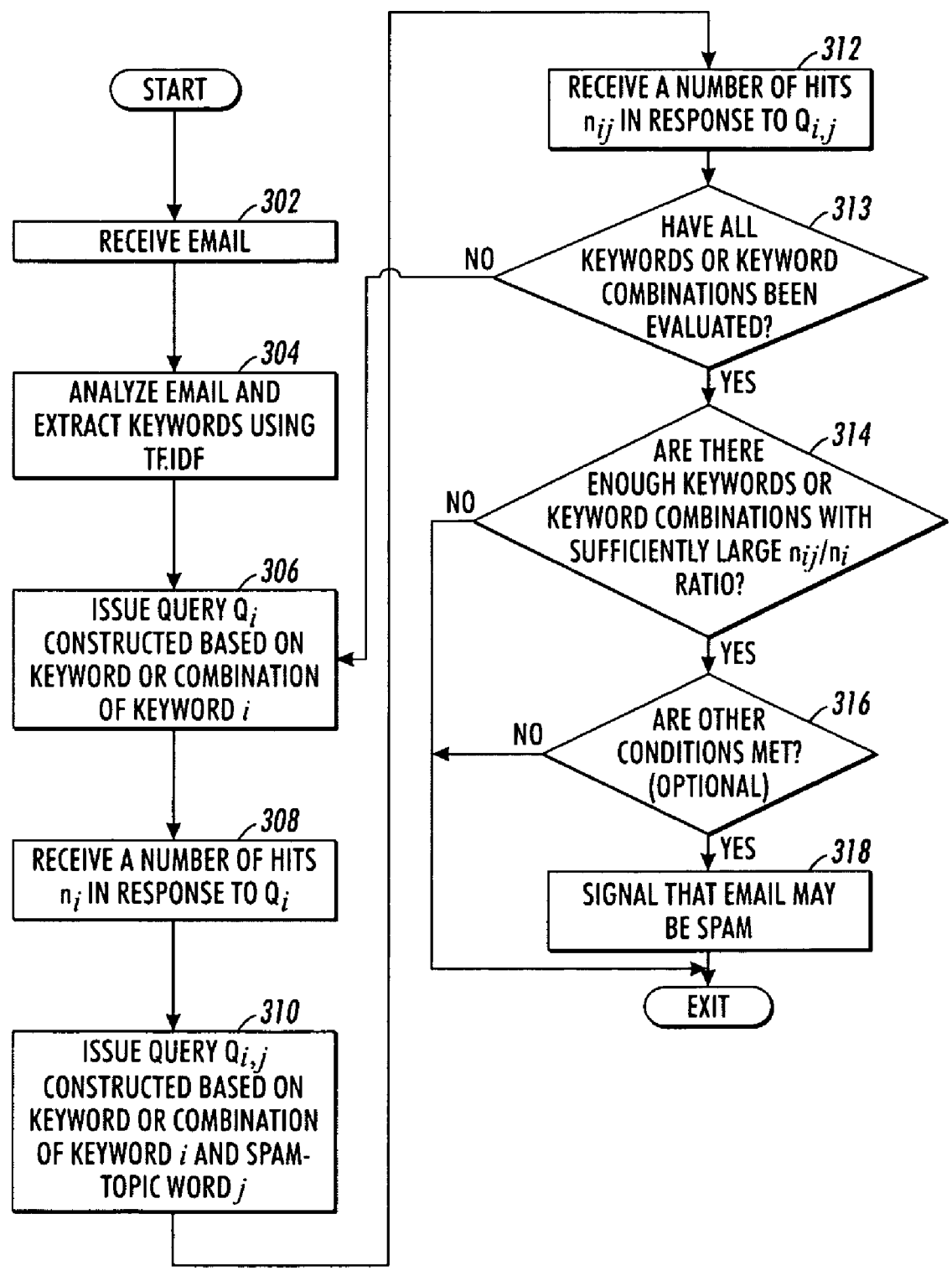
FIG. 3 presents a flow chart illustrating an exemplary process of filtering an incoming email based on keywords extracted from the email in accordance with an embodiment of the present invention.

FIG. 3 presents a flow chart illustrating an exemplary process of filtering an incoming email based on keywords extracted from the email in accordance with an embodiment of the present invention. During operation, the system receives an email (operation 302). The system then analyzes the email and extracts a number of keywords using TF.IDF analysis (operation 304). The system further issues query $Q_i$, which is constructed based on keyword or keyword combination i (operation 306). In response, the system receives a number of hits $n_i$ (operation 308).

Next, the system issues query $Q_{i,j}$, which is constructed based on keyword or keyword combination i and spam-topic word j (operation 310). In response to $Q_{i,j}$, the system receives a number of hits $n_{ij}$ (operation 312). Subsequently, the system determines whether all keywords or keyword combinations have been evaluated (operation 313). If not, the system proceeds to examine the next keyword or keyword combination (operation 306). If all keywords or keyword combinations have been evaluated, the system further determines whether there are enough keywords or keyword combinations with sufficiently large $n_{ij}/n_i$ ratio (operation 314). If so, the system optionally determines whether other conditions are met (operation 316) and signals that the email may be spam (operation 318). Otherwise, the system exits.

Another common spamming technique is to insert non-spam words into the subject lines or body of an email, thereby attempting to thwart statistical spam filters that examine the statistics of a message (e.g., word frequencies) to determine whether an email is spam. These words could be random words or carefully chosen words that are less likely to trigger a spam filter. In one embodiment, the system measures the number of hits returned from a query based on words extracted from spam emails. This is because typically the words in the subject line of a spam email do not make much sense, and the number of hits returned by queries based on these words would be much smaller than the number of hits returned by queries based on words extracted from legitimate emails. TABLE 2 shows examples of subject lines from spam emails and legitimate emails. For example, the first row of TABLE 2 shows that the Google query "harassment awareness" (without quotation marks) from the subject line of a legitimate email returns approximately 1,180,000 hits, whereas a query based on the subject line "Chaos DDT" (without quotation marks) from a spam email returns approximately 240,000 hits. Note that using quotation marks around the subject keywords generally reduces the hit counts, especially in the case of spam emails. Furthermore, the keywords in the query extracted from the subject line of legitimate emails are not necessarily contiguous in the subject line.

TABLE 2

| Word pairs extracted from subject lines of legitimate emails | Number of hits returned by Google query of word pairs | Word pairs extracted from subject lines of spam emails | Number of hits returned by Google query of word pairs |
| --- | --- | --- | --- |
| harassment awareness | 1,180,000 | Chaos DDT | 240,000 |
| influential people | 8,660,000 | Dairy cow | 1,780,000 |
| talk about | 491,000,000 | Dup new | 1,290,000 |
| employee feedback | 16,800,000 | Inattention windfall | 23,500 |
| reading group | 202,000,000 | Feelings partner | 1,820,000 |
| broadband providers | 6,820,000 | Optimist gardening | 939,000 |
| Unfurnished home | 1,430,000 | Daydreamer outrage | 946 |
| Delivery problems | 73,000,000 | Marsupial propeller | 9,520 |
| Fun party | 107,000,000 | Luggage distinguished | 715,000 |

In a further embodiment, the system examines the compatibility between the subject line and the body text of the email. For example, if a message with the subject line "optimist gardening" is indeed about gardening, then the words in the message should include ones commonly associated with gardening. Hence, by evaluating whether the subject line represents the topic of the email body, the system can determine whether the email is likely to be spam. In one embodiment, the system follows the following operations:

1. The system extracts keywords from the text body of an email, forming the set B. The system further extracts keywords from the subject line, forming the set S.
2. The system then selects sets of top-ranked keywords $B_i$ from B and sets of top-ranked keywords $S_j$ from S. (Note that in one embodiment the ranking can be accomplished based on the TF.IDF weight of a respective keyword.) The system then merges the two sets and constructs queries from the merged set, wherein each query contains at least one keyword from the set B and at least one keyword from the set S. Let $\{Q_i\}$ denote the set of queries issued (i.e., $Q_i$ is a query based on the words in $B_i \cup S_j$) and let $n_i$ denote the number of hits returned by query $Q_i$. The number of keywords used in each query and the number of queries to be issued are parameters tunable by the user based on the desired running time and thoroughness of the inference detection.
3. For each keyword extracted from the email body, $B_1$, $B_2$, ..., the system issues a separate search query. Let $n_{Bi}$ denote the number of hits returned.
4. For the keywords in set B, if the $n_i/n_{Bi}$ ratios are sufficiently small, the system signals that the email may be spam. The decision to treat the email as spam may depend on the number of such query pairs with small $n_i/n_{Bi}$ ratio.

Figure 4:
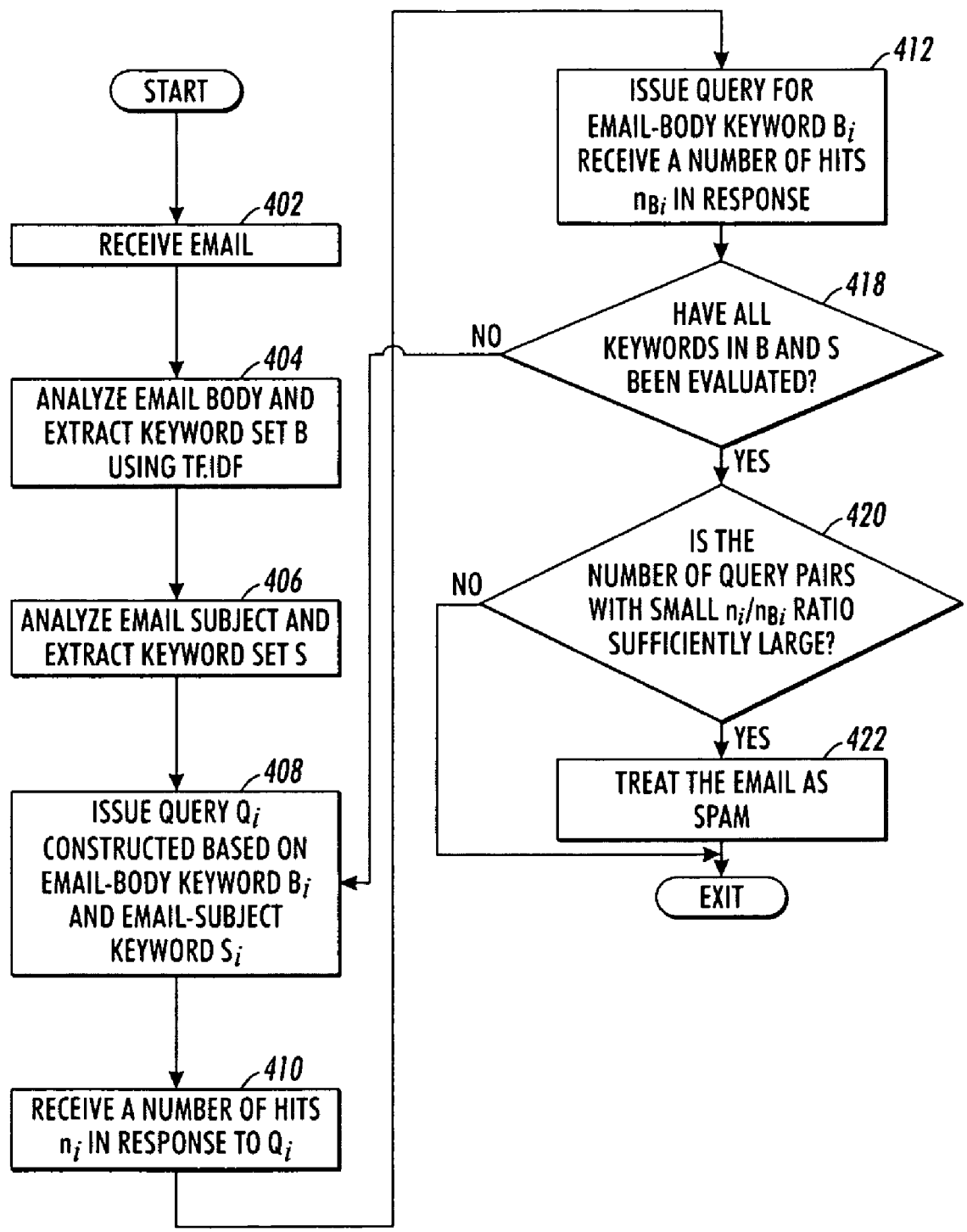
FIG. 4 presents a flow chart illustrating an exemplary process of filtering an incoming email based on keywords extracted from the email body and the email subject in accordance with one embodiment of the present invention.

FIG. 4 presents a flow chart illustrating an exemplary process of filtering an incoming email based on keywords extracted from the email body and the email subject in accordance with one embodiment of the present invention. During operation, the system receives an email (operation 402). The system then uses TF.IDF to analyze the email body and extract a keyword set B (operation 404). Next, the system analyzes the email subject line and extracts keyword set S (operation 406). Note that, since the subject line is typically short, using TF.IDF is optional in operation 406.

Next, the system issues query $Q_i$ which is constructed based on an email-body keyword $B_i$ and email-subject keyword $S_i$ (operation 408). The system subsequently receives a number of hits $n_i$ in response to query $Q_i$ (operation 410). The system further issues a query for email-body keyword $B_i$ and receives a number of hits $n_{Bi}$ in response to the query (operation 412).

The system then determines whether all the keywords in B and S have been evaluated (operation 418). If not, the system proceeds to issue the next query $Q_i$ (operation 408). If all the keywords in B and S have been evaluated, the system then determines whether the number of query pairs with sufficiently small $n_i/n_{Bi}$ ratio is sufficiently large (operation 420). If so, the system treats the email as spam (operation 422). Otherwise, the system exits.

Website Filtering

Conventional Website filtering systems rely on manually generated blacklists and a limited number of automated techniques to determine what sites to block. Embodiments of the present invention can use the Web to continuously update keywords associated with undesired Websites, which can then be matched against a Website's content to determine whether the Website should be blocked. For example, the system can proactively probe the Web and discover that new phrases like "Omaha high" or "Texas holdem" are related to gambling sites to which access should be restricted.

In one embodiment, the system identifies inferences in Websites by performing the following operations:

1. The system receives a list of restricted Web-site topics $T_1, \ldots, T_k$ (e.g., "gambling," "porn," etc.).
2. For a respective restricted-topic word, the system issues a search query and receives a number of hits.
3. The system extracts a set of keywords from the returned hits. Based on these keywords, the system formulates search queries $Q_i$. Let $n_i$ denote the number of hits returned in response to $Q_i$. The number of keywords used in the query and the number of queries to be issued are parameters tunable by the user based on the desired running time and thoroughness of the inference detection.
4. For a respective query $Q_i$, the system issues a second query, $Q_{iT}$, using the keyword or keyword combination in $Q_i$ and the restricted-topic word. Let $n_{iT}$ be the number of hits returned.
5. If $n_{iT}/n_i$ is sufficiently large, the system notes the term(s) in $Q_i$ as being possibly related to the restricted topic. The decision to restrict access to Websites containing the sensitive term(s) may depend on the identification of a threshold number of such inference-enabling queries as well as the values of the $n_{iT}/n_i$ ratio.

For example, the query "Omaha high" returns approximately 3,000,000 hits from Google. The query "Omaha high gambling" returns approximately 1,460,000 hits. The $n_{iT}/n_i$ ratio is 0.48, which may be sufficiently large for the system to identify "Omaha high" to be a sensitive word and to block Web-sites that contain this phrase.

Figure 5:
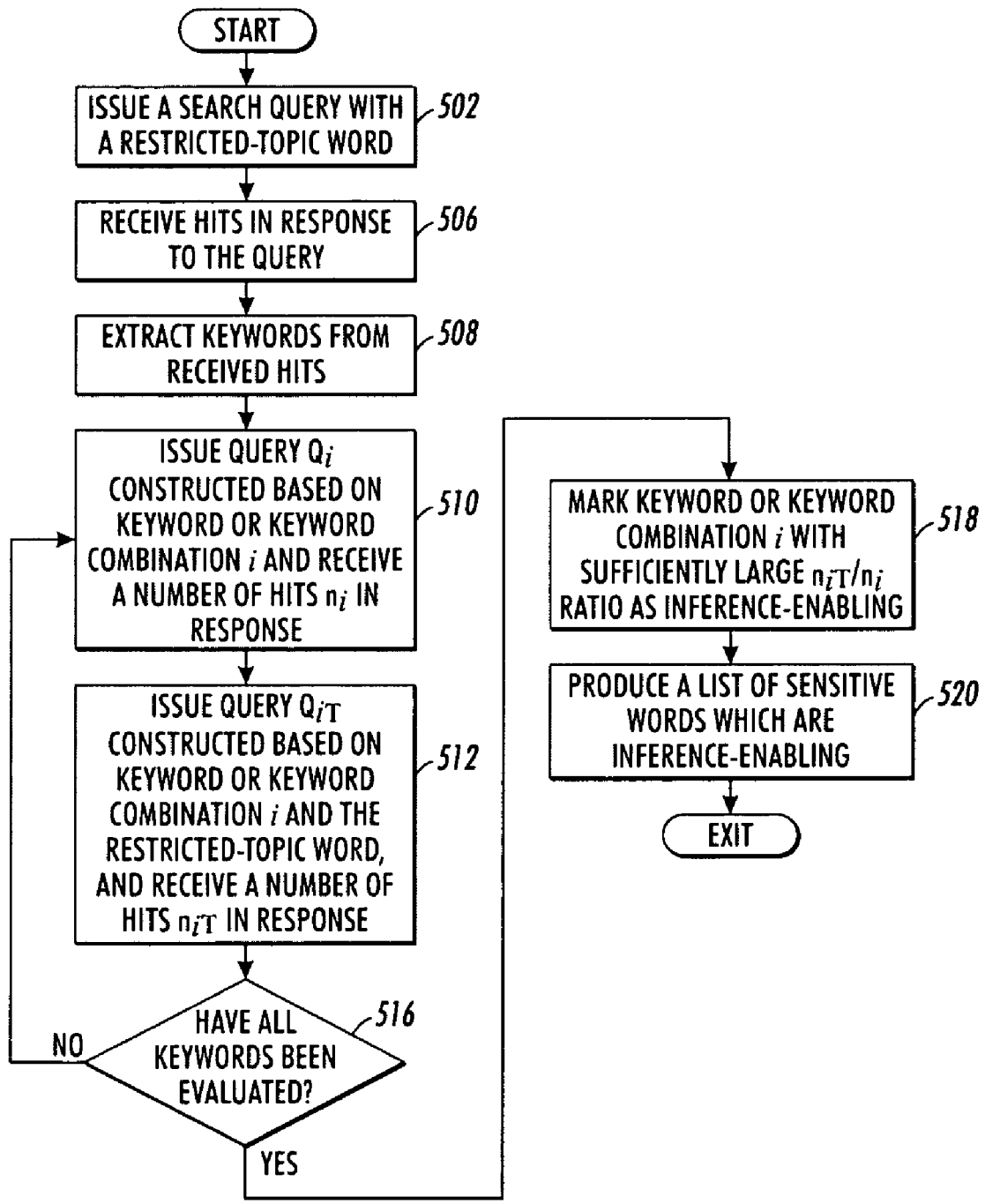
FIG. 5 presents a flow chart illustrating an exemplary process of filtering Websites in accordance with one embodiment of the present invention.

FIG. 5 presents a flow chart illustrating an exemplary process of filtering Websites in accordance with one embodiment of the present invention. During operation, the system issues a search query with a restricted-topic word (operation 502). The system then receives hits in response to the query (operation 506). Next, the system extracts keywords from the received hits (operation 508). The system subsequently issues query $Q_i$ which is constructed based on keyword or keyword combination i and receives a number of hits $n_i$ in response of query $Q_i$ (operation 510).

The system further issues query $Q_{iT}$ which is constructed based on keyword or keyword combination i and the restricted-topic word, and receives a number of hits $n_{iT}$ in response to $Q_{iT}$ (operation 512). Next, the system determines whether all the keywords have been evaluated (operation 516). If not, the system issues the next query $Q_i$ (operation 510). If all the keywords have been evaluated, the system then marks all the keywords or keyword combinations with sufficiently large $n_{iT}/n_i$ ratio as inference-enabling (operation 518). Next, the system produces a list of sensitive words which are inference-enabling (operation 520). The system then exits.

System Operation

Figure 6:
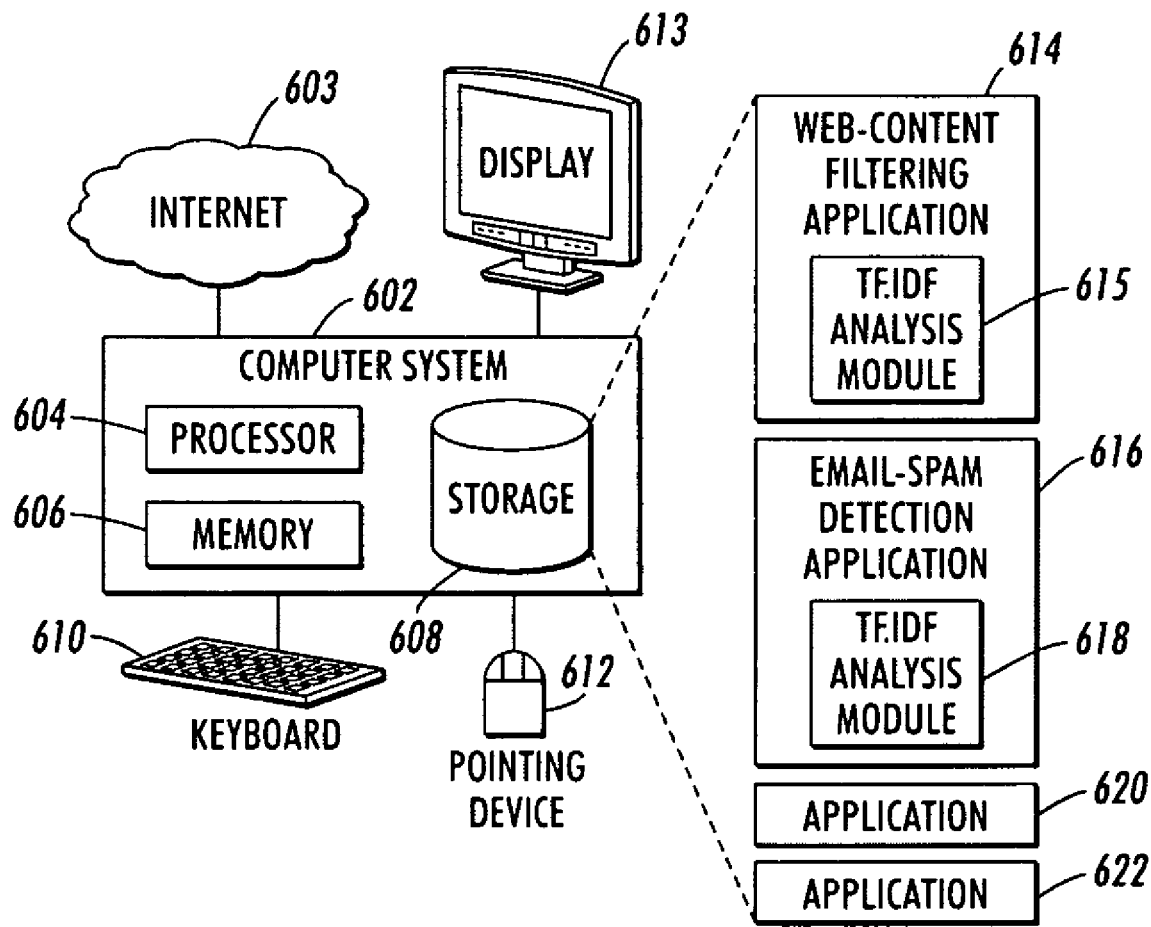
FIG. 6 illustrates a computer system for filtering incoming emails and Websites in accordance with one embodiment of the present invention.

FIG. 6 illustrates a computer system for filtering incoming emails and Websites in accordance with one embodiment of the present invention. A computer system 602 includes a processor 604, a memory 606, and a storage device 608. Computer system 602 is coupled to the Internet 603, a display 613, a keyboard 610, and a pointing device 612. Storage device 608 stores a Web-content filtering application 614, an email-spam detection application 616, and applications 620 and 622. Web-content filtering application 614 includes a TF.IDF analysis module 615. Similarly, email-spam detection application 616 includes a TF.IDF analysis module 618. During operation, Web-content filtering application 614 and/or email-spam detection application 616 are loaded into memory 606 and executed by processor 604. Correspondingly, processor 604 performs inference-detection based email-spam detection and Web-content filtering as described above.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for detecting unwanted email, the method comprising:
    extracting a set of keywords from a received email's body;
    constructing a first search query using a keyword extracted from the email body;
    constructing a second search query using the keyword and an additional word that is a known spam topic word;
    issuing, to a search engine, the first search query and the second search query;
    receiving, from the search engine, a first number of hits and a second number of hits in response to the first and second search queries respectively;
    determining whether the email is unwanted, based on a comparison between the first number of hits and the second number of hits and a likelihood that the additional word corresponds to a spam topic, which involves computing a ratio between the first number and the second number; and
    indicating whether the email is unwanted based on the determination.

2. The method of claim 1, wherein extracting the set of keywords from the email body comprises determining a term-frequency inverse-document-frequency (TF.IDF) weight for a respective word or phrase contained in the email body.

3. The method of claim 2, wherein extracting the set of keywords from the email body further comprises ranking a respective word based on its TF.IDF weight.

4. A computer system for detecting unwanted email, the computer system comprising:
    a processor;
    a memory coupled to the processor;
    a keyword-extraction mechanism configured to extract a set of keywords from a received email's body;
    a query-formulation mechanism configured to construct:
        a first search query using a keyword extracted from the email body, and
        a second query using the keyword and an additional word that is a known spam topic word;
    a hits-receiving mechanism configured to:
        issue, to a search engine, the first search query and the second search query; and
        receive, from the search engine, a first number of hits and a second number of hits in response to the first and second search queries respectively;
    a determination mechanism configured to determine whether the email is unwanted based on a comparison between the first number of hits and the second number of hits and a likelihood that the additional word corresponds to a spam topic, wherein determining whether the email is unwanted comprises computing a ratio between the first number and the second number; and
    an indication mechanism configured to indicate whether the email is unwanted based on the determination.

5. The method of claim 4, wherein while extracting the set of keywords from the email body, the keyword-extraction mechanism is configured to determine a term-frequency inverse-document-frequency (TF.IDF) weight for a respective word or phrase contained in the email body.

6. The computer system of claim 5, wherein while extracting the set of keywords from the email body, the keyword-extraction mechanism is further configured to rank a respective word based on its TF.IDF weight.

* * * * *